A. L. RIKER.
SPEED CHANGING MECHANISM.
APPLICATION FILED FEB. 4, 1907.

1,051,515.

Patented Jan. 28, 1913.

3 SHEETS—SHEET 2.

Witnesses:
Horace A. Crossman
Robert H. Hammler

Inventor:
Andrew L. Riker
by Emery & Booth,
Attys

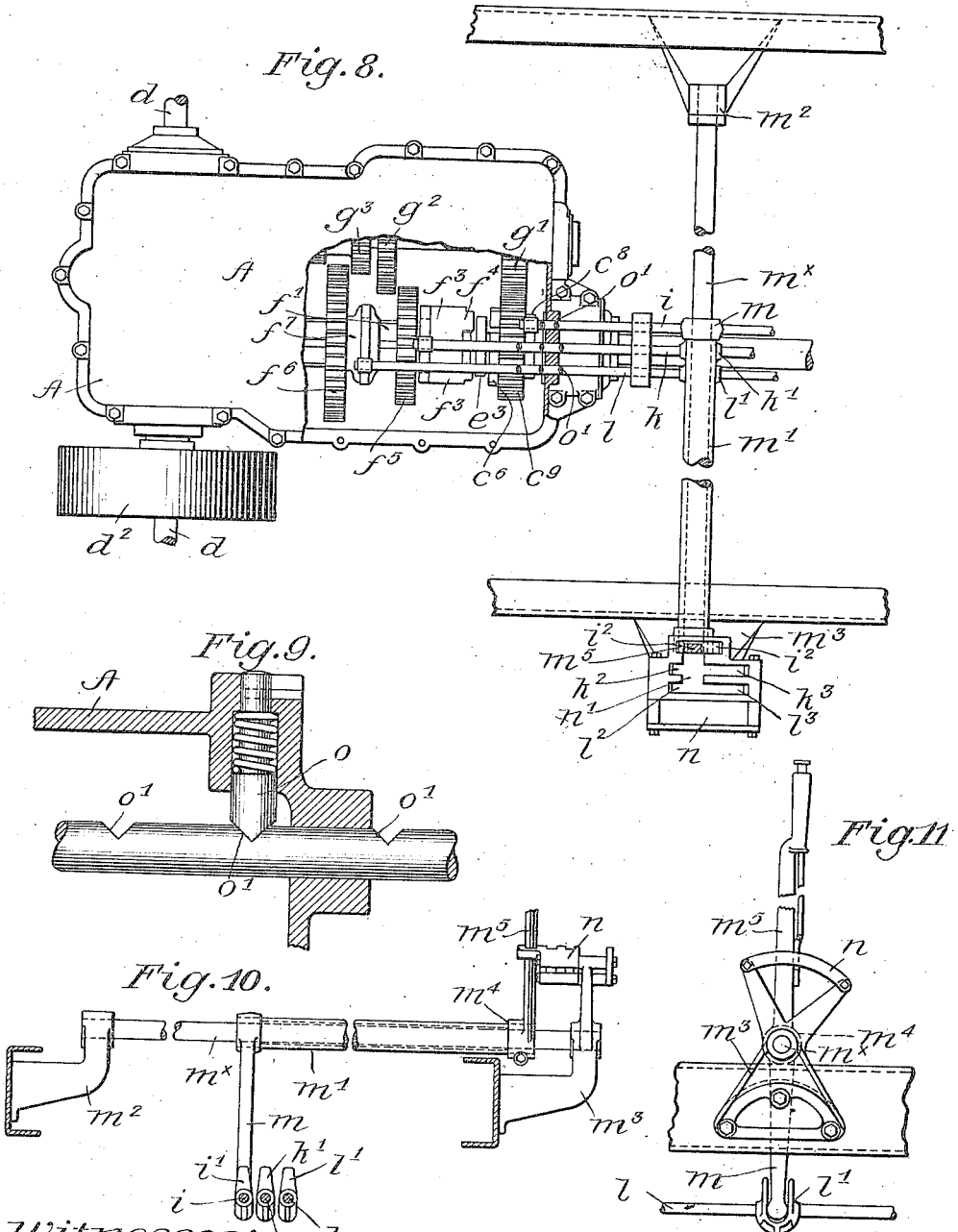

UNITED STATES PATENT OFFICE.

ANDREW L. RIKER, OF BRIDGEPORT, CONNECTICUT, ASSIGNOR TO THE "LOCOMOBILE" COMPANY OF AMERICA, OF NEW YORK, N. Y., A CORPORATION OF WEST VIRGINIA.

SPEED-CHANGING MECHANISM.

1,051,515. Specification of Letters Patent. Patented Jan. 28, 1913.

Application filed February 4, 1907. Serial No. 355,582.

*To all whom it may concern:*

Be it known that I, ANDREW L. RIKER, a citizen of the United States, residing at Bridgeport, in the county of Fairfield and State of Connecticut, have invented an Improvement in Speed-Changing Mechanism, of which the following description, in connection with the accompanying drawings, is a specification, like letters on the drawings representing like parts.

This invention relates to speed-changing mechanism for changing the relative speed between a driving and a driven member, and more particularly to mechanism of simple and compact form wherein a plurality of speeds may be had by the shifting of one or more intermediate working parts.

In the illustrated form of my invention the same is shown as embodied in the transmission mechanism which serves the purpose of what is usually termed the "transmission gear" of an automobile, which transmission gear as is well-known is customarily imposed between the engine,—usually an internal combustion engine,—and the driving shaft or driving wheels for the purpose of imparting to the latter any one of a plurality of speeds without necessary change of engine speed.

My invention will be best understood by reference to the following description when taken in connection with the accompanying illustration of one specific embodiment thereof, while its scope will be more particularly pointed out in the appended claims.

Figure 1:
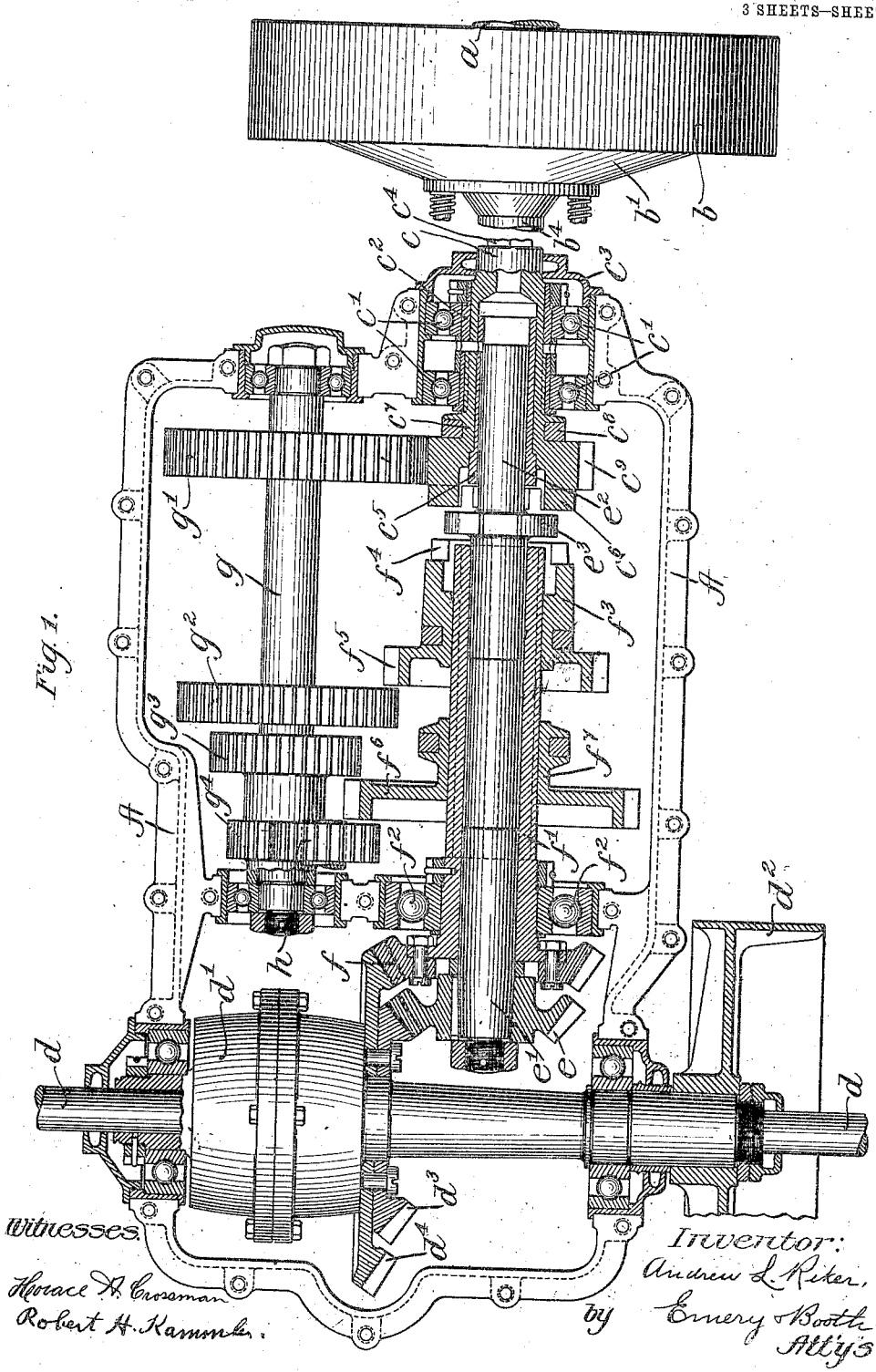
Figure 6:
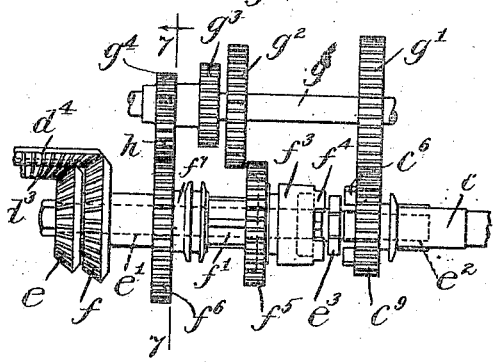
Figure 7:
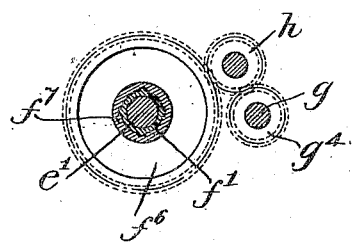

In the drawings,—Figure 1 is a plan view partly in section showing the principal working parts of a transmission gear embodying one form of my invention; Figs. 2 to 6, inclusive, show the principal speed-changing elements of the mechanism illustrated in Fig. 1 in different positions corresponding to different selected transmitted speeds; Fig. 7 is a section on the line 7—7 in Fig. 6 showing the position of the reversing or idle gear; Fig. 8 is a plan view showing the relation of the controlling parts of the transmission gear illustrated in Fig. 1; Fig. 9 is a detail on an enlarged scale of the positioning pin for the controlling rods; Fig. 10 is an end elevation looking toward the front and showing the controlling levers and controlling rods, and Fig. 11 is a side elevation of the controlling lever.

Referring to the drawings and to the transmission gear which I have chosen to illustrate the speed-changing mechanism of my invention, there is shown in Fig. 1 a horizontal section of the principal working parts. These are assembled in a gear casing or housing A, which as is usual in this class of devices, is split along a median horizontal plane and the two halves thereof bolted one to another. In Fig. 1 the casing is shown with the upper half removed. This casing may be assumed, as is usual, to be mounted or carried upon the motor vehicle beneath the body thereof. It contains suitable transmitting elements for transmitting from the engine shaft $a$ and the engine beyond at the forward end of the vehicle (not shown), through the stationary and movable clutch members $b$ and $b'$, respectively, and the driving shaft $c$ any one of a plurality of speeds to the driven shaft $d$. The driven shaft $d$ which carries within the casing the usual balance gear $d'$ and without the casing the brake wheel $d^2$, herein extends through the rear of the casing at right angles to the axis of the driving shaft $c$, or crosswise the vehicle, and is here assumed to be counter or parallel to the rear driving wheels with which it may have suitable sprocket chain or other connection. It will be obvious however that such shaft may have any desired and appropriate relation to the driving shaft $c$, or may itself comprise the driving axle for the driving wheels, the identity of the driven member or the particular manner of communicating movement therefrom to the driving wheels not being of essential importance to this invention. The engine and clutch members $b$, $b'$ may have any usual or ordinary construction, but these parts and their customary location, both with reference to the transmission gear and the frame and other parts of the vehicle, being well understood by those skilled in the art, are not here specifically illustrated.

Referring now more particularly to the speed-changing elements of the transmission gear itself, the main driving member is embodied in the driving shaft $c$, which has a bearing at the forward end of the casing and is axially alined with the engine shaft $a$ so as to form in effect a continuation thereof with the interposition of the main clutch $b$, $b'$. This shaft may have bearings of any suitable construction, the same herein comprising ball bearings $c'$ as shown, mounted in separated race-ways to afford an extended bearing support and an unyielding alinement to the driving shaft. The revoluble race-ways of the bearings are carried upon an intermediate hollow sleeve $c^2$, which is held against end-wise movement but is keyed or splined to the driving shaft $c$, so as to permit a sliding or endwise movement of the latter within the sleeve. An oil-tight cap $c^3$ covers the bearing and various suitable oil ducts are provided leading to the bearing surfaces of the several journaled parts to provide for free distribution of the lubricating oil, a liberal supply of which is usually maintained within the gear casing. The exteriorly projecting end of the driving shaft may have any suitable connection with the engine shaft which will permit the occasional shifting or sliding movement required, and same is here shown as provided with a squared end $c^4$ (shown broken away), such squared end having a telescopic fit within the end (not shown) of a tubular shaft $b^4$ projecting from the rear end of the movable clutch member $b'$, so that the driving shaft is at all times driven with said movable clutch member, while permitting longitudinal or endwise movement relatively thereto.

Referring now to the opposite end of the casing and the driven shaft $d$, the latter is provided with a pair of bevel gears $d^3$ and $d^4$, bolted side by side to the end of the balance gear housing. The smaller of these bevel gears $d^3$ is in constant mesh with the beveled pinion $e$, which latter is keyed or otherwise fixedly secured to the rear end of the intermediate shaft $e'$, the latter being in axial alinement with the driving shaft $c$ and having a projecting forward end $e^2$, which enters the open rear end of the said shaft and is revolubly but telescopically journaled in the replaceable bushing or lining $c^5$ fixedly held within the hollow end of the said driving shaft.

The highest speed is attained by clutching or coupling the driving shaft directly to the intermediate shaft $e'$. For this purpose the inner or rear end of the driving shaft is formed of enlarged diameter and provided with a plurality of suitably formed clutch teeth $c^6$. It is also provided with a circumferentially grooved collar $c^7$ which is engaged by an operating yoke $c^8$. When the highest speed is desired, such yoke is moved rearwardly through controlling levers hereafter described, to carry the clutch teeth $c^6$ into engagement with the corresponding teeth of a fixed clutch member $e^3$ which is carried upon the intermediate shaft $e'$, closely adjacent the normal position of the clutch teeth $c^6$, it being understood that the movable clutch member $c^6$ and the fixed clutch member $e^3$, as well as the outer speed changing elements, are shown in Fig. 1 as occupying the relative positions which they assume when the transmission gear is idle or inactive and no movement is being transmitted from the engine to the driven shaft $d$. When engagement is effected between the clutch teeth $c^6$ and $e^3$, however, the driving and intermediate shafts are directly coupled one to another and the engine drives the driven shaft $d$ through the intermediate shaft and the bevel gears $e$ and $d^3$.

Meshing with the larger bevel gear $d^4$ upon the driven shaft is a beveled pinion $f$, the latter being bolted or otherwise suitably secured to the flanged end of a sleeve or tubular shaft $f'$. The latter is mounted upon and concentrically with the intermediate shaft $e'$ to rotate independently thereof, having a journaled connection therewith for a considerable portion of its length. The tubular shaft is mounted in ball bearings $f^2$, the latter sustained by a transverse wall within the casing. The long projecting bearing of the intermediate shaft within the end of the driving shaft and the long journaled support of the intermediate shaft within the tubular shaft gives an extremely rigid alinement to the several elements and provides in effect three axially alined, independently rotatable shafts so interconnected as to be sustained in rigid alinement between the two sets of ball bearings shown.

To obtain the second or next to the highest speed, the driving shaft is clutched or coupled directly to the tubular shaft, so that transmission to the shaft is then through the bevel gear $d^4$ and the shaft $d$ at a reduced speed. For this purpose there is provided a sleeve $f^3$, splined to the tubular shaft but capable of endwise movement thereon, the normal position of the said sleeve being, as shown in Fig. 1, adjacent the forward end of the said shaft. The end of the said sleeve is cup-shaped or recessed and is provided at its edge with clutch teeth $f^4$ which aline and are adapted to engage, with the clutch teeth $c^6$ upon the end of the driving shaft when the said sleeve is slid in a forward direction. When the sleeve is moved into engagement with the driving shaft, the walls of the sleeve merely encompass the fixed intermediate clutch member $e^3$, there being left ample clearance for the latter within the cup-shaped walls of the sleeve. With the tubular shaft clutched directly to the driving shaft as described, the transmission is direct through the bevel gears $f$ and $d^4$ but at a reduced speed. As will be evident the intermediate shaft is turned idly through its gearing connection to the driven shaft when the tubular shaft is coupled to the driving shaft.

It will thus be seen that this transmission gear instead of being limited to a single "direct drive" or coupling between the driving and driven shafts, has two such direct drives at different speeds. It will be evident that this principle may be extended to provide for any desired number of direct drives at different speeds by providing other intermediate members which may be coupled separately to the driving shaft.

In order to provide for other speeds through intermediate gearing in addition to the two separate speeds secured through the "direct drive" connections described, there is provided at the side of the driving shaft and the tubular and intermediate shafts a counter-shaft $g$, suitably journaled in ball bearings in the casing, said counter shaft having a counter-shaft driving gear $g'$, which is driven from a similar driving gear $c^6$, the latter carried by the sliding driving shaft $c$. The counter-shaft gear $g'$ is in constant engagement with the driving gear $c^6$, so that the counter-shaft is constantly driven by the driving shaft at a reduced speed. Adjacent its opposite end the counter-shaft is provided with other gears fixedly secured thereto and driven thereby, these gears being employed separately to engage with one or more suitable sliding elements upon the tubular shaft and thereby drive the latter at other and reduced rates of speed. Any appropriate number of such gears may be provided but herein they are three in number,—a large gear $g^2$, an intermediate gear $g^3$ and a small gear $g^4$.

To obtain the third or next highest forward speed, the large counter-shaft $g^2$ is caused to engage with a gear $f^5$ carried by the sliding sleeve $f^3$ upon the tubular shaft, this being effected by sliding the sleeve rearwardly or away from the driving shaft. In this position of the sleeve the transmission is through the counter-shaft, the larger gear $g^2$, the smaller gear $f^5$ and the tubular shaft $f'$.

The next or lowest speed forward is secured by causing the intermediate counter-shaft gear $g^3$ to engage with a second gear $f^6$, the latter being carried by a separate sliding sleeve $f^7$ splined to the tubular shaft $f'$. This sleeve is provided with the usual grooved collar and operating yoke whereby it may be slid forwardly to cause engagement between the gear $f^6$ and gear $g^3$, the transmission then taking place at the slowest speed through the counter-shaft, the small gear $g^3$ and the large gear $f^6$.

For the reverse speed the gear $f^6$ may be slid in the opposite or rearward direction to engage with an idle gear $h$, the relative endwise position of which is best shown in Fig. 7. The gear $h$, which is journaled in suitable bearings carried by the casing is constantly driven by the small counter-shaft gear $g^4$, and, when caused to mesh with the sliding gear $f^6$, transmits driving movement at a reduced speed from the driving shaft to the driven shaft in a reverse direction.

The sliding movements of the several sliding elements of the gear may be controlled in any suitable way and in Figs. 8–11 I have illustrated one method by which this may be readily accomplished. The sliding member $c^7$ for the driving shaft and the sleeves $f^3$ and $f^7$ for the tubular shaft are engaged each at their circumferential grooves by suitable yokes which are attached respectively to the separate longitudinal slidable controlling rods $i$, $k$ and $l$. The latter pass through the forward end of the casing and are supported in suitable bearings (not shown) for longitudinal sliding movement. These rods are provided with upturned forked portions $i'$, $k'$ and $l'$, respectively, which are adapted each separately to receive and be engaged by the end of a depending arm or finger $m$ which is carried by an overhead transversely slidable sleeve $m'$. The sleeve $m'$ is slidably and rotatively mounted upon a horizontal shaft $m^x$ sustained in brackets $m^2$, $m^3$, and provided adjacent one end at $m^4$ with a vertical controlling lever $m^5$, the handle of which is located adjacent the operator of the vehicle. It therefore follows that by movement of the handle laterally, the sleeve may be slid laterally and the finger $m$ caused to engage with one or another of the three forked rods and by imparting a forward or back movement to the operating lever the sleeve and its finger are rocked to cause simultaneous movement of the rod in engagement with said finger. The standards $m^2$ and $m^3$ with their supported shaft $m^x$ are fixedly secured to the frame, so that when the sleeve $m'$ and its finger $m$ are rocked by forward or backward movement of the controlling lever said finger causes forward or backward movement of the yoked rod with which it is then engaged.

Referring particularly to Figs. 8, 10 and 11, the controlling lever passes through an arc-shaped controlling plate $n$, fixedly secured to the frame-work of the vehicle. This plate is provided (see Fig. 8) with a transverse slot $n'$ and several longitudinal slots branching therefrom. These comprise the rearwardly branching slots $i^2$, $k^2$ and $l^2$ and the forward slots $l^3$ and $k^3$, the latter alining respectively with the slots $l^2$ and $k^2$. It will readily be understood that with the combined sliding and swinging movement the lever may be moved to seat itself in any one of the five longitudinal slots referred to. In the inactive position of the gearing elements, the lever is maintained in said transverse central slot $n'$ between the abutting edges of the plate so as to be incapable of longitudinal swinging movement. The gear is then inoperative, the controlling rods being maintained in their central position, as shown in Fig. 11, and the transmission elements as shown in Fig. 1, where no driving movement is transmitted to the driven shaft and the counter-shaft turns idly in its bearings.

Figure 2:
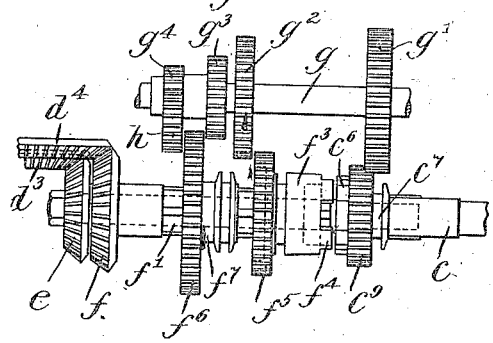

For the highest speed forward the lever is moved inwardly to aline with the slot $i^2$, as shown in Fig. 8, and then forwardly, or to the right Fig. 8, to be seated in that slot. This causes the depending finger or arm $m$ to engage the yoke $i'$ upon the rod $i$ and move the latter, together with its attached driving shaft $c$ rearwardly to couple the driving shaft directly to the intermediate shaft and connect the transmission elements, as best shown in Fig. 2. It will there be seen that with the counter-shaft turning idly in its bearings, the driving shaft $c$ is directly coupled to cause transmission through the high speed bevel gearing $e$ and $d^3$.

Figure 3:
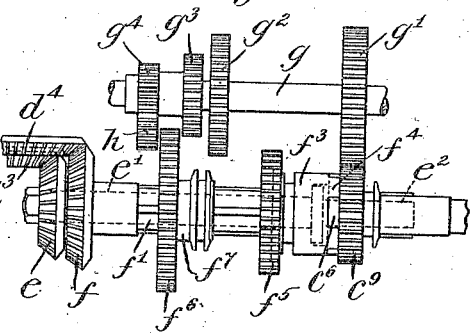

To obtain the next highest speed the lever is unseated from the slot $i^2$ and moved outwardly into alinement with the slot $k^2$ and then rearwardly to be seated in that slot. This causes the depending finger to engage the yoke $k'$ and draw the sliding sleeve $f^3$ forwardly to couple the driving shaft directly to the tubular sleeve, leaving the parts as shown in Fig. 3. Here, with the counter-shaft still idly turning, and the intermediate shaft disconnected from the driving shaft, the latter is connected for direct drive, but at a reduced speed, through the bevel gears $f$ and $d^3$.

Figure 4:
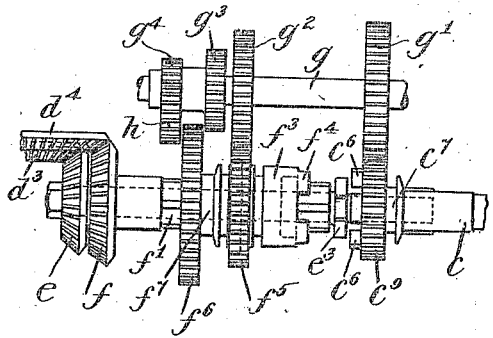

For the third speed forward the lever is seated in the forward slot $k^3$, which acts to slide the sleeve $f^3$ in the opposite or rearward direction, causing the sliding gear $f^5$ to mesh with the large counter-shaft gear $g^2$, thereupon giving the indirect drive through the counter-shaft to the tubular sleeve as shown by the relative position of the parts in Fig. 4, both clutches being disconnected at this speed.

Figure 5:
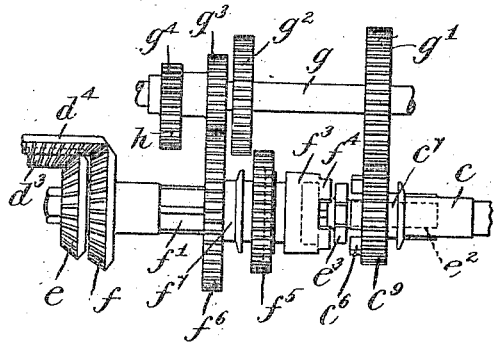

For the lowest forward speed, the controlling lever is seated in the slot $l^2$, which causes the finger $m$ to engage with and advance the controlling rod $l$ with the effect of causing engagement between the sliding gear $f^6$ and the intermediate counter-shaft gear $g^3$, as best shown in Fig. 5.

The reverse speed, as will be obvious, is secured by seating the controlling lever in the forward slot $l^3$, thus acting to bring the sliding gear $f^6$ into mesh with the idle gear $h$, as best seen in Fig. 6.

It will thus be seen that the controlling lever can assume control over but one of the three sliding elements at any one time and that while this sliding element is operatively positioned by movement of the lever to give the desired speed, the other sliding elements are inoperatively positioned, as represented in Fig. 1, so as to have no effect upon the transmission. In order that they may preserve their inoperative positions when not under control of the controlling lever, a positioning device is provided for each rod, the same consisting herein of a vertically slidable spring-pressed pin $o$ (Fig. 9), having a beveled or pointed tip which rests against the upper edge of the corresponding rod and when the rod is properly positioned may be seated in one of several notches $o'$ cut in the upper edge of the rod. After the lever has been brought back to its mid position, and before it assumes control of another rod the pin $o$ snaps into the registering notch and holds the rod against movement until again engaged by the depending finger $m$.

My invention is not limited to the particular embodiment thereof herein shown and described, or to the particular application herein made of the same, but extensive modifications and deviations from the form, construction and arrangement of parts may be made without departing from the spirit of the invention.

Claims.

1. A transmission mechanism for motor vehicles comprising a casing, a driving shaft, a sleeve having a bearing in said casing, said driving shaft being slidable longitudinally within said sleeve, a transverse driven shaft passing through said casing at the opposite end thereof, an intermediate shaft in alinement with said driving shaft and having a telescopic bearing in the end of the same, a bevel gear secured to the opposite end of said intermediate shaft, a gear meshing therewith upon the transverse shaft, a tubular shaft upon said intermediate shaft but rotatable independently thereof, a bevel gear upon the tubular shaft of greater diameter than the said first bevel gear, a second gear upon the transverse shaft meshing therewith, bearings in said casing for said tubular shaft near one end adjacent the transverse shaft, a fixed clutch member upon the intermediate shaft between the driving shaft and the tubular shaft, a clutch member upon the driving shaft adapted to engage the fixed clutch member when the shaft is slid toward the same, a clutch member slidably mounted upon the tubular shaft but splined thereto and adapted to be slid into engagement with the clutch member of the driving shaft while still clearing the intermediate fixed clutch member, a counter-shaft at the side of said driving and tubular shafts, intermeshing gears upon said driving shaft and counter-shaft respectively to cause constant rotation of the latter, a plurality of gears on said counter-shaft driven thereby, a gear carried by the slidable clutch member and adapted to mesh with the counter-shaft gear when the clutch member is slid oppositely from the driving clutch, thereby to cause the tubular shaft to be driven at a reduced speed, a second gear slidably mounted on the tubular shaft and adapted to be moved in one direction to mesh with a smaller countershaft gear to impart a different speed to the said shaft, an idle or reversing gear, another counter-shaft gear in constant engagement therewith, said second slidable gear being adapted to mesh with said idle gear when slid in the opposite direction, thereby to reverse the movement of the tubular shaft, suitable controlling levers and connections between the same and the driving shaft, tubular clutch member and sliding gear respectively for appropriately moving the same.

2. Transmission mechanism for motor vehicles comprising a driving shaft, a driven shaft, an intermediate shaft in alinement with said driving shaft and having a telescopic bearing in the end of the same, a gearing connection between said intermediate shaft and driven shaft, a tubular shaft independently rotatable upon said intermediate shaft, a gearing connection also between said tubular shaft and said driven shaft, a fixed clutch member upon the intermediate shaft, a clutch member upon the driving shaft, means for causing relative movement between the same to directly couple the driving shaft to the intermediate shaft, a clutch member screwed to but slidable on the tubular shaft and adapted to engage the clutch member upon the driving shaft, thereby to couple the driving shaft directly to the tubular shaft, a counter-shaft driven from said driving shaft, a plurality of driven gears upon the counter-shaft, a gear carried by the slidable clutch member on the tubular shaft and adapted to be moved into engagement with one of said counter-shaft gears, a second gear slidably mounted on the tubular shaft and adapted to be moved for engagement with a second counter-shaft gear, an idle or reversing gear, a third counter-shaft gear in engagement with said idle or reversing gear, the latter being adapted to mesh with said second sliding gear on further and opposite movement of the latter, and suitable controlling levers and connections for controlling said several slidable elements.

3. Transmission mechanism for motor vehicles comprising a driving shaft, a driven shaft, an intermediate shaft in alinement with said driving shaft and having a telescopic bearing in the end of the same, a gearing connection between said intermediate shaft and driven shaft, a tubular shaft independently rotatable upon said intermediate shaft, a gearing connection also between said tubular shaft and said driven shaft, a fixed clutch member upon the intermediate shaft, a clutch member upon the driving shaft, means for causing relative movement between the same to directly couple the driving shaft to the intermediate shaft, a clutch member secured to but slidable on the tubular shaft and adapted to engage the clutch member upon the driving shaft, thereby to couple the driving shaft directly to the tubular shaft, a counter-shaft driven from said driving shaft, a plurality of driven gears upon the counter-shaft, a gear carried by the slidable clutch member on the tubular shaft and adapted to move into engagement with one of said counter-shaft gears, and a second gear slidably mounted on the tubular shaft and adapted to be moved for engagement with a second counter-shaft gear.

4. A speed-changing mechanism comprising a driving shaft, a driven shaft, an intermediate shaft in alinement with the driving shaft and having a telescopic bearing in the end of the same, a gearing connection between said intermediate shaft and said driven shaft, a tubular shaft upon said intermediate shaft, a gearing connection between the same and said driven shaft, means for coupling said driving shaft to said intermediate shaft, a sliding clutch member upon the tubular shaft for separately coupling the latter to said driving shaft to provide a different speed, a counter-shaft driven at a reduced speed from said driving shaft and provided with a driven gear, and a gear carried by said clutch member upon the tubular shaft and adapted to be moved into engagement with said counter-shaft gear to drive said tubular shaft and said driven shaft at a reduced speed.

5. A speed-changing mechanism comprising a driving shaft, a driven shaft, an intermediate shaft in alinement with the driving shaft and having a telescopic bearing in the end of the same, a gearing connection between said intermediate shaft and said driven shaft, a tubular shaft upon said intermediate shaft, a gearing connection between the same and said driven shaft, means for coupling said driven shaft to said intermediate shaft, a sliding clutch member upon the tubular shaft for separately coupling the latter to said driving shaft to provide a different speed, a counter-shaft driven by said driving shaft at a reduced speed and provided with a plurality of driven gears, a gear carried by said sliding clutch member upon said tubular shaft and adapted to be moved into engagement with one of said counter-shaft gears to provide a reduced speed for said tubular shaft, and a second gear also slidably mounted upon said tubular shaft and adapted to be moved into engagement with another counter-shaft gear to drive said tubular shaft at a different speed.

6. A speed-changing mechanism comprising a driving shaft, a driven shaft, an intermediate shaft alined with said driving shaft, a tubular shaft on said intermediate shaft, a clutch member upon said intermediate shaft, a clutch member upon said driving shaft adapted to engage therewith for direct drive of the intermediate shaft, and a movable clutch member upon said tubular shaft adapted to engage with the clutch member upon said driving shaft for a direct drive of the tubular shaft.

7. A speed-changing mechanism comprising a slidably mounted driving shaft, a clutch member thereon, a shaft alined therewith provided with a stationary clutch member adapted to be engaged by the clutch member of said driving shaft, a tubular shaft upon said alining shaft and a cup-shaped clutch member on said tubular shaft adapted to move into engagement with the clutch member of said driving shaft while still clearing the clutch member of said alining shaft.

8. A speed-changing mechanism comprising a driving shaft, a driven shaft, a plurality of intermediate driving members operatively related to said driven shaft, means for coupling directly said driving shaft to either of said intermediate members, a counter-shaft driven from said driving shaft, a gear driven by said counter-shaft, and a gear slidably mounted upon one of said intermediate members to engage with said counter-shaft gearing and drive said intermediate member at a reduced speed.

9. A transmission gearing for motor vehicles comprising a driving shaft, a driven shaft, a plurality of intermediate shafts alined with said driving shaft operatively related to said driven shaft, means for coupling said driving shaft to either of said intermediate shafts, a counter-shaft constantly driven from said driving shaft at a reduced speed and having gearing connections with one of said intermediate shafts, and means for rendering said connections operative or inoperative to drive said intermediate shaft at one or more reduced speeds.

10. A transmission gearing for motor vehicles comprising the driving shaft $c$, the driven shaft $d$, intermediate shafts $e'$ and $f'$ connected to drive the driven shaft, and the clutching devices $c^6$, $e^3$ and $f^4$ having provision for relative movement between each other.

11. A transmission gearing having the shafts $c$, $d$, $f'$ and $e'$, the latter connected to drive the shaft $d$, the clutching device $c^6$, $f^4$ and $e^3$ having provision for relative movement between each other, and a counter-shaft $g$ with attached gearing.

12. A speed changing mechanism comprising, in combination, a driving shaft; a driven shaft; a plurality of co-axial intermediate means adapted to be directly connected with the driving shaft for transmitting motion from the latter to the driven shaft at different speeds, driving connections between the intermediate means and the driven shaft and separately movable means for connecting said intermediate means with the driving shaft for said different speeds.

13. A speed changing mechanism comprising, in combination, a driving shaft; a driven shaft; a plurality of co-axial intermediate means adapted to be directly connected with the driving shaft for transmitting motion from the latter to the driven shaft at different speeds, driving connections between the intermediate means and the driven shaft; separately movable means for connecting said intermediate means with the driving shaft for said different speeds; and unitary means to govern selectively said separately controlled means.

14. A speed changing mechanism comprising, in combination, a driving shaft; a driven shaft; a plurality of co-axial intermediate means adapted to be directly connected with the driving shaft for transmitting motion from the latter to the driven shaft at different speeds, driving connections between the intermediate means and the driven shaft; additional power transmitting means between the driving shaft and the driven shaft; separately movable means for connecting said co-axial intermediate means respectively with the driving shaft for driving the driven shaft at said different speeds; and means governed by one of said separately movable means for throwing into operation said additional transmission means thereby to drive the driven shaft at still another speed.

15. A speed changing mechanism comprising, in combination, a driving shaft; a driven shaft; a plurality of co-axial transmission means intermediate the driving shaft and driven shaft for transmitting power from the former to the latter at different respective speeds; driving connections between the said transmission means and the driven shaft; a single clutch device on the driving shaft; and separate relatively movable clutch devices on the respective transmission means arranged for alternative engagement with said single clutch device on the driving shaft.

16. A speed changing mechanism comprising, in combination, a driving shaft; a driven shaft; a plurality of transmission means intermediate said shafts; clutch means for connecting the driving shaft with one of said transmission means; additional clutch means for connecting the driving shaft with another of said transmission means; separate controlling means for the respective clutch means; and selective governing means for said controlling means.

17. A speed changing mechanism comprising, in combination, a driving shaft; a driven shaft; a plurality of transmission means intermediate the driving and driven shafts; means to connect the transmission means respectively to the driving shaft; a gear mounted on the driving shaft; a countershaft, a gear thereon constantly engaged by the gear on the driving shaft whereby the countershaft is constantly driven from the driving shaft; and means for connecting the countershaft to the driven shaft for driving the latter at a speed different from those of the direct transmission means.

18. A speed changing mechanism comprising, in combination a driving shaft; a driven shaft; a plurality of intermediate driving members; means for coupling directly said driving shaft to either of said intermediate members; a countershaft driven from said driving shaft; a gear driven by the countershaft; a gear slidably mounted upon one of said intermediate members and controlled with said coupling means, to engage with the countershaft gearing.

19. A transmission mechanism for motor vehicles comprising in combination a driving shaft, a driven shaft, driving connections between said driving shaft and driven shaft including a plurality of devices either of which is adapted to be directly coupled to the driving shaft to impart to the driven shaft a plurality of different speeds and including also separately controlled intermediate gearing for securing variable speeds between the driving and driven shafts, and means for controlling said intermediate gearing.

20. A speed changing mechanism comprising a driving shaft, a driven shaft, driving connections between said driving shaft and driven shaft including a pair of co-axial intermediate means adapted to directly connect with the driving shaft for transmitting motion from the latter to the driven shaft, and means for directly connecting either of said means with said driving shaft and including also a countershaft with means for connecting the same with the driving shaft and with said intermediate means to drive the driven shaft at either one or more reduced speeds, or in a reverse direction.

21. A speed changing mechanism comprising in combination a driving shaft, a driven shaft, a plurality of co-axial, intermediate elements adapted to be directly connected with the driving shaft for transmitting motion from the latter to the driven shaft, driving connections between said intermediate elements and said driven shaft, a countershaft, a plurality of independently movable elements for connecting said driving shaft directly to either of said intermediate elements or to connect the countershaft with the driving shaft and one of the intermediate elements and means engaging said independently movable elements to move the same.

22. A speed changing mechanism comprising a driving shaft, a driven shaft, a plurality of co-axial elements adapted to be directly connected with the driving shaft for transmitting motion from the latter to the driven shaft, driving connections between said coaxial elements and said driven shaft, a countershaft, and a plurality of independently movable elements for connecting said driving shaft directly to either one of said intermediate elements or to connect the countershaft with the driving shaft and one of the intermediate elements to drive said driven shaft, at one or more reduced speeds or in a reverse direction and means engaging said movable elements to move the same.

In testimony whereof, I have signed my name to this specification, in the presence of two subscribing witnesses.

ANDREW L. RIKER.

Witnesses:
Wm. S. Teel, Jr.,
Thomas B. Booth.